US012650374B2

(12) United States Patent
Jiang et al.

(10) Patent No.: US 12,650,374 B2
(45) Date of Patent: Jun. 9, 2026

(54) OPTICAL COMPONENT FOR DIRECTLY MEASURING ORIGINAL VALENCE STATE, ORIGINAL FORM AND ORIGINAL PHASE STATE OF HIGH-CONCENTRATION LIQUID IN REAL TIME

(71) Applicant: TONGJI UNIVERSITY, Shanghai (CN)

(72) Inventors: Linhua Jiang, Shanghai (CN); Ning Duan, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/430,231

(22) Filed: Dec. 22, 2025

(65) Prior Publication Data

US 2026/0133120 A1    May 14, 2026

Related U.S. Application Data

(63) Continuation of application No. PCT/CN2024/114722, filed on Aug. 27, 2024.

(30) Foreign Application Priority Data

Aug. 16, 2024    (CN) .......................... 202411130815.1

(51) Int. Cl.
*G01N 21/01*        (2006.01)
*G01N 21/59*        (2006.01)

(52) U.S. Cl.
CPC ............. *G01N 21/01* (2013.01); *G01N 21/59* (2013.01); *G01N 2021/0106* (2013.01); *G01N 2021/0175* (2013.01); *G01N 2201/0694* (2013.01)

(58) Field of Classification Search
CPC ................... G01N 21/01; G01N 21/59; G01N 2021/0106; G01N 2021/0175; G01N 2201/0694
See application file for complete search history.

(56) References Cited

U.S. PATENT DOCUMENTS 5,602,647 A * 2/1997 Xu .......................... G01N 21/31
356/440
6,643,016 B2 * 11/2003 Garver ................... G01N 21/33
356/312

(Continued)

FOREIGN PATENT DOCUMENTS

CN        113740257 A  * 12/2021 ............. G01N 21/01
CN        116840183 A  * 10/2023 ......... G01N 21/3577

(Continued)

*Primary Examiner* — Tarifur R Chowdhury
*Assistant Examiner* — Joshua M Carlson
(74) *Attorney, Agent, or Firm* — KIRTON McCONKIE; Evan R. Witt

(57) ABSTRACT

An optical component for directly measuring an original valence state, an original form and an original phase state of a high-concentration liquid in real time is provided, including a PLC control module, a monochromatic light purification module, a light intensity control module, a sensitivity adjustment module, and a multi-species perception module. Based on a monitoring requirement for different species, under the control of the PLC control module, the monochromatic light purification module emits monochromatic light. The light intensity control module adjusts light intensity of the monochromatic light. The sensitivity adjustment module adjusts attenuation of the monochromatic light. The multi-species perception module feeds back a measurement signal of the monochromatic light to the PLC control module.

3 Claims, 2 Drawing Sheets

(56) References Cited

U.S. PATENT DOCUMENTS

| 7,847,944 | B2 * | 12/2010 | Buettner | ............. | G01N 21/274 |
| | | | | | 356/243.1 |
| 2019/0107436 | A1 * | 4/2019 | Dohi | ....................... | G01J 3/021 |
| 2022/0228988 | A1 * | 7/2022 | Kim | .................... | B01L 3/50851 |

FOREIGN PATENT DOCUMENTS

| JP | H11229949 A | * | 8/1999 |
| JP | 2012132827 A | * | 7/2012 |

* cited by examiner

OPTICAL COMPONENT FOR DIRECTLY MEASURING ORIGINAL VALENCE STATE, ORIGINAL FORM AND ORIGINAL PHASE STATE OF HIGH-CONCENTRATION LIQUID IN REAL TIME

CROSS-REFERENCE TO RELATED APPLICATION

This application is a continuation of International Application No. PCT/CN2024/114722, filed on Aug. 27, 2024, which claims the benefit and priority of Chinese Patent Application No. 202411130815.1 filed with the China National Intellectual Property Administration on Aug. 16, 2024.

TECHNICAL FIELD

The present disclosure relates to the field of detection and analysis for an original valence state, an original form and an original phase state of multiple species of a high-concentration complex liquid in the process industry, in particular to an optical component for directly measuring an original valence state, an original form and an original phase state of a high-concentration liquid in real time.

BACKGROUND

In the process industry, the multi-component chemical reaction process is characterized by fast reaction speed, multiple reactants, and gas-solid-liquid coexistence. Multiple valence states, multiple forms and multiple phase states of different species coexist in the solution and the concentration span is large (in some cases, the difference is up to tens of thousands of times). In the industrial production process, product quality, production costs, quantity and toxicity of pollutants in a liquid phase system are determined by a concentration of a species, especially a valence state and a phase state of the species. This is because the valence state, the form and the phase state of the species in the microchemical process are closely related to the thermodynamics and kinetics of the chemical reaction, which directly affects the occurrence or reaction degree of the unit reaction. Therefore, measuring the valence state, the form and the phase state of the species is very important for improving product quality, reducing production costs, quantity and toxicity of pollutants in the industrial production process.

At present, analysis methods all over the world can only measure a single valence state or a total number of elements in the solution, and cannot analyze true valence state and form of the species. Inductively coupled plasma emission spectroscopy/mass spectrometry, atomic fluorescence spectrometry, and national standard spectrophotometry that are widely used in enterprises can be used to monitor low-concentration pollutants in the external environment, regardless of off line or on line. However, in the monitoring of high-concentration liquid phase systems in the industrial process, samples need to be pre-processed, which changes a valence state, a form and a phase state of chemical species. As a result, drug dosage deviation or even wrong drug delivery occurs occasionally, long time is consumed, and a risk of secondary contamination is obvious. A detection upper limit is only in a range of milligrams per liter, and the detection result is severely delayed in terms of time. Therefore, it is difficult to implement real-time feedback to the industrial process, and requirements of corporate production, safety and environmental protection cannot be met.

SUMMARY

To solve the foregoing problems in the prior art, the present disclosure provides an optical component for directly measuring an original valence state, an original form and an original phase state of a high-concentration liquid in real time, including a Programmable Logic Controller (PLC) control module, a monochromatic light purification module, a light intensity control module, a sensitivity adjustment module, and a multi-species perception module. For requirements that different species characteristic spectrums correspond to high pure lights with different wavelengths and different concentration absorption spectrums correspond to different incident lights, a transmission light intensity signal of a multi-wavelength receiving module under different optical path combination conditions is used to first intelligently search and accurately match with high-purity incident light wavelengths required by different species based on principles that light absorption intensity is the highest and central spectral linewidth is the narrowest, and then automatically adjust optimal incident light energy that matches with species with different concentrations based on principles of high absorption, high transmission and high sensitivity, so as to implement second level synchronous and direct measurement of valence states, forms, phase states and concentrations of different species by coupling optical components with high-purity light extraction, light energy adjustment, multiple optical path combinations, and multi-wavelength receiving.

The technical scheme of the present disclosure is as follows:

An optical component for directly measuring an original valence state, an original form and an original phase state of a high-concentration liquid in real time includes a PLC control module, a monochromatic light purification module, a light intensity control module, a sensitivity adjustment module, and a multi-species perception module;

the monochromatic light purification module includes a power switch, a power adapter, a multi-wavelength and multi-light-intensity light source, and a multi-wavelength and multi-stage filter wheel; the power switch and the power adapter convert 220V alternating current into 5V/2 A direct current, and supply power to the multi-wavelength and multi-light-intensity light source; the multi-wavelength and multi-light-intensity light source emits composite light;

the multi-wavelength and multi-stage filter wheel includes light filter discs 1, light filters 2, and a servo motor 3; circular holes are disposed on each light filter disc 1, and the number of the circular holes is not less than 2; the light filters 2 are installed in the circular holes, and the light filters 2 in different circular holes have different central wavelengths and different spectral linewidths; there are two light filter discs 1 in total, the circular holes in one of the two light filter discs 1 are in one-to-one correspondence to and are overlapped with the circular holes in another one of the two light filter discs (1), and the light filters 2 installed in two overlapped circular holes have different central wavelengths and different spectral linewidths;

the composite light emitted by the multi-wavelength and multi-light-intensity light source sequentially passes through the two light filters 2 in the circular holes of the multi-wavelength and multi-stage filter wheel to become monochromatic light;

the two light filter discs 1 are fixedly connected to the servo motor 3 as a whole; driven by the servo motor 3, the two light filter discs 1 move circumferentially around a central axis of the two light filter discs 1, so that different circular holes and light filters 2 move to the front of the composite light for filtering to obtain monochromatic lights with different central wavelengths;

incident light intensity of the monochromatic light is defined as $I_0$, light absorption intensity absorbed by a target species is defined as $I_a$, and transmission intensity transmitted from the target species to the multi-species perception module is defined as $I_t$, that is, $I_0=I_a+I_t$;

the light intensity control module includes a power/current continuously adjustable regulator; the PLC control module changes $I_0$ of the monochromatic light by adjusting a knob of the power/current continuously adjustable regulator, and following conditions is met:

when a concentration of the target species changes between a minimum value and a maximum value, after the monochromatic light is absorbed and attenuated by the target species, the multi-species perception module is still able to receive a signal of the monochromatic light, that is, $I_t>0$;

the sensitivity adjustment module is formed by combining flow cells with different optical paths, and adjusts different optical paths based on different concentrations of the target species; when the concentration of the target species is relatively large, an optical path is decreased, so that the total number of the target species transmitted by the monochromatic light is relatively small; when the concentration of the target species is relatively small, the optical path is increased, so that the total number of the target species transmitted by the monochromatic light is relatively large; finally, the monochromatic light received by the multi-species perception module meets the following conditions:

(1) under different concentrations, light absorption sensitivity $\Delta I_a$ of the target species is the maximum;

(2) when the target species has a maximum concentration, the multi-species perception module is able to receive a signal of the monochromatic light absorbed and attenuated by the target species, that is, $I_t>0$;

(3) when the target species has a minimum concentration, the monochromatic light received by the multi-species perception module is attenuated, that is, $I_0>I_t>0$; and the multi-species perception module includes an optoelectronic receiver and a signal amplifier, and is configured to receive monochromatic light with different central wavelengths corresponding to different target species, and transmission intensities $I_t$ under different incident intensities and different optical paths corresponding to different concentrations, converts a received light signal into an electrical signal, amplifies the electrical signal, and feeds back amplified electrical signal to the PLC control module in real time.

In an embodiment, the composite light has a wavelength range of 180-900 nm;

the light filter 2 has a spectral linewidth of ±0.03 nm; and the sensitivity adjustment module has an optical path range of 0.5 mm to 100 mm.

In an embodiment, a working flow is as follows:

S1, the PLC control module sends a first instruction for determining the target species to the monochromatic light purification module based on requirements a valence state, a form, a phase state and concentration of the target species from an upper computer;

S2, the monochromatic light purification module enables the multi-wavelength and multi-light-intensity light source based on the first instruction, rotates the multi-wavelength and multi-stage filter wheel, and outputs high-purity monochromatic light referred to as a first output 1; in this case, the light intensity control module and the sensitivity adjustment module do not work, and the first output directly reaches the multi-species perception module;

S3, the multi-species perception module measures the first output to obtain a measurement result, that is, a first feedback, and sends the first feedback to the PLC control module;

S4, the PLC control module selects from the light filters 2 of the multi-wavelength and multi-stage filter wheel based on the first feedback until the monochromatic light with optimal central wavelength and spectral linewidth that meets the requirement of the first instruction is obtained; the monochromatic light in this case is referred to as optimal incident light;

S5, the PLC control module sends a second instruction that includes concentration change range of the target species defined by the maximum concentration and minimum concentration to the light intensity control module;

S6, the light intensity control module dynamically adjusts the knob of the power/current continuously adjustable regulator from low to high based on the second instruction, so that the monochromatic light purification module emits monochromatic lights with different light intensities $I_0$, referred to as a second output; in this case, the sensitivity adjustment module does not work, and the second output directly reaches the multi-species perception module;

S7, the multi-species perception module measures the second output to obtain a measurement result, that is, a second feedback, and sends the second feedback to the PLC control module;

S8, the PLC control module adjusts the knob of the power/current continuously adjustable regulator based on the second feedback to form closed-loop control until a light intensity $I_0$ of the optimal incident light that meets the following condition is obtained:

when the concentration of the target species changes between the minimum concentration and the maximum concentration, the multi-species perception module is able to receive a transmission signal of the optimal incident light, that is, $I_t>0$;

S9, the PLC control module sends a third instruction that includes a high-frequency concentration change range of the target species to the sensitivity adjustment module;

S10, the sensitivity adjustment module automatically adjusts a combination of the flow cells from low to high based on the third instruction, so that an optical path of the monochromatic light passing through the sensitivity adjustment module changes; the monochromatic light emitted by the sensitivity adjustment module is referred to as an third output;

S11, the multi-species perception module measures the third output to obtain a measurement result, that is, a third feedback, and sends the third feedback to the PLC control module;

S12, the PLC control module adjusts the optical path of the sensitivity adjustment module based on the third feedback to form closed-loop control until an optimal optical path that meets the following condition is obtained:

(1) under different concentrations, light absorption sensitivity $\Delta I_a$ of the target species is the maximum;

(2) when the target species has a maximum concentration, the multi-species perception module is able to receive a signal of the monochromatic light absorbed and attenuated by the target species, that is, $I_t > 0$; and (3) when the target species has a minimum concentration, the monochromatic light received by the multi-species perception module is attenuated, that is, $I_0 > I_t > 0$.

The present disclosure has the following beneficial technical effects:

Based on principles that central spectral linewidth is the narrowest, light absorption intensity is the highest, and transmission light sensitivity is the highest, closed-loop feedback of the PLC control module and the multi-species perception module is used to intelligently search and accurately match with high-purity incident light wavelengths required by different species, and automatically adjust optimal incident light energy and a combination of multiple optical paths that match with species with different concentrations, so as to implement second level synchronous and direct measurement of valence states, forms, phase states, and concentrations of different species.

In drawings, correspondence between part names and drawing numbers is as follows: 1: light filter disc; 2: light filter; 3: servo motor; and 4: circular hole.

DETAILED DESCRIPTION OF THE EMBODIMENTS

The following describes the present disclosure in conjunction with drawings and embodiments. Apparently, the embodiments in the following description are merely a part rather than all of the embodiments of the present disclosure. All other embodiments obtained by those skilled in the art on the basis of the embodiments of the present disclosure without requiring the exercise of inventive effort fall within the scope of protection of the present disclosure.

Figure 1:
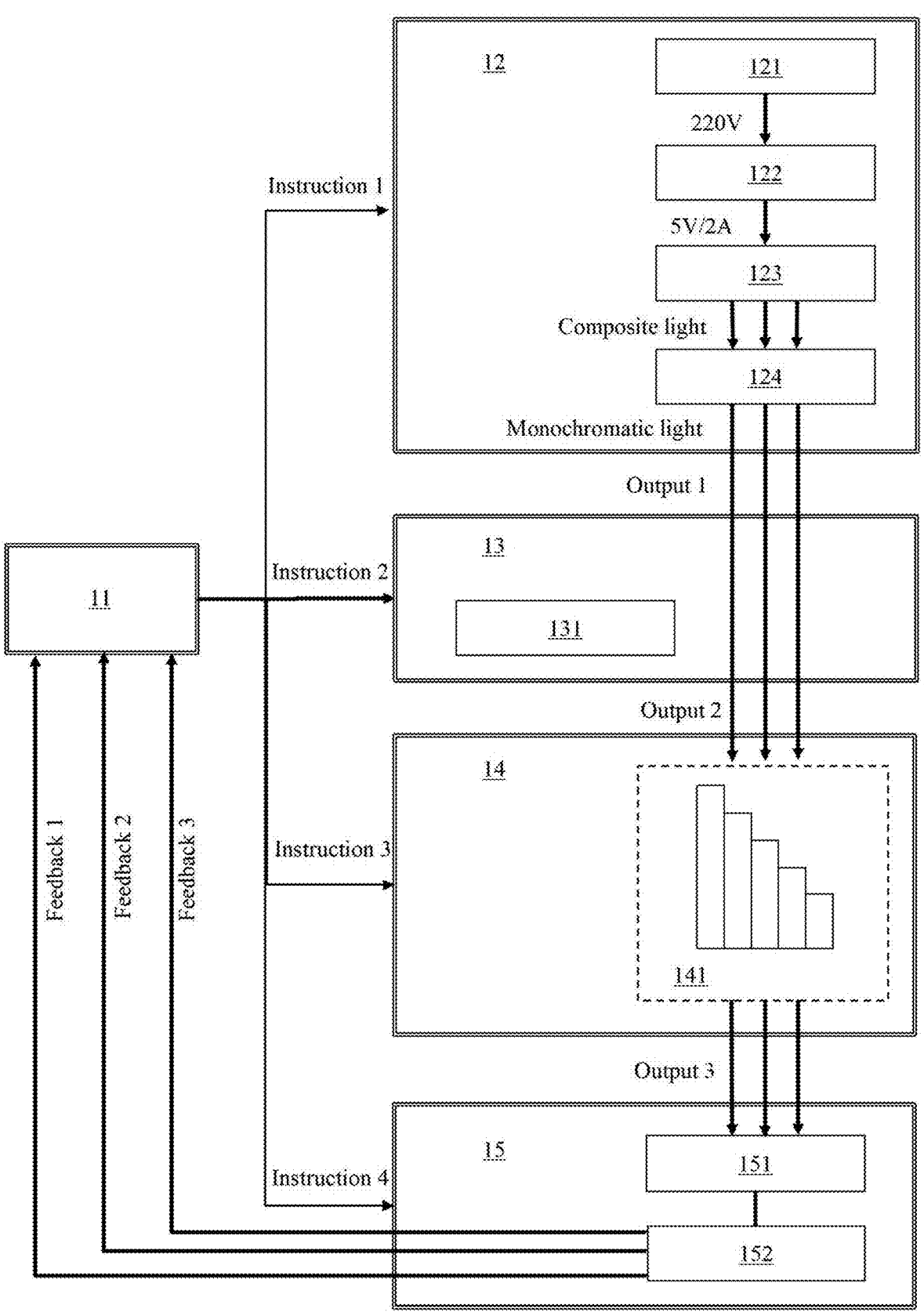
FIG. 1 is a system principle diagram of an embodiment.

As shown in FIG. 1, an embodiment includes a PLC control module 11, a monochromatic light purification module 12, a light intensity control module 13, a sensitivity adjustment module 14, and a multi-species perception module 15.

The PLC control module 11 has hardware of Siemens PLC S7-1200. Based on valence state, form, phase state, and concentration requirements of a target species, the PLC control module 11 may send instructions to a monochromatic light purification module 12, a light intensity control module 13, a sensitivity adjustment module 14, and a multi-species perception module 15 respectively, and receive a feedback signal of the multi-species perception module 15.

The monochromatic light purification module 12 includes a power switch 121, a power adapter 122, a multi-wavelength and multi-light-intensity light source 123, and a multi-wavelength and multi-stage filter wheel 124. The power switch 121 and the power adapter 122 convert 220V alternating current into 5V/2 A direct current, and supply power to the multi-wavelength and multi-light-intensity light source 123. The multi-wavelength and multi-light-intensity light source 123 may emit composite light with a wavelength range of 180-900 nm. The multi-wavelength and multi-stage filter wheel 124 may provide light filters with various central wavelengths, and spectral linewidth is ±0.03 nm. The composite light emitted by the multi-wavelength and multi-light-intensity light source 123 may be purified into high-purity monochromatic light (hereinafter referred to as monochromatic light), which meets requirements of the target species.

Figure 2:
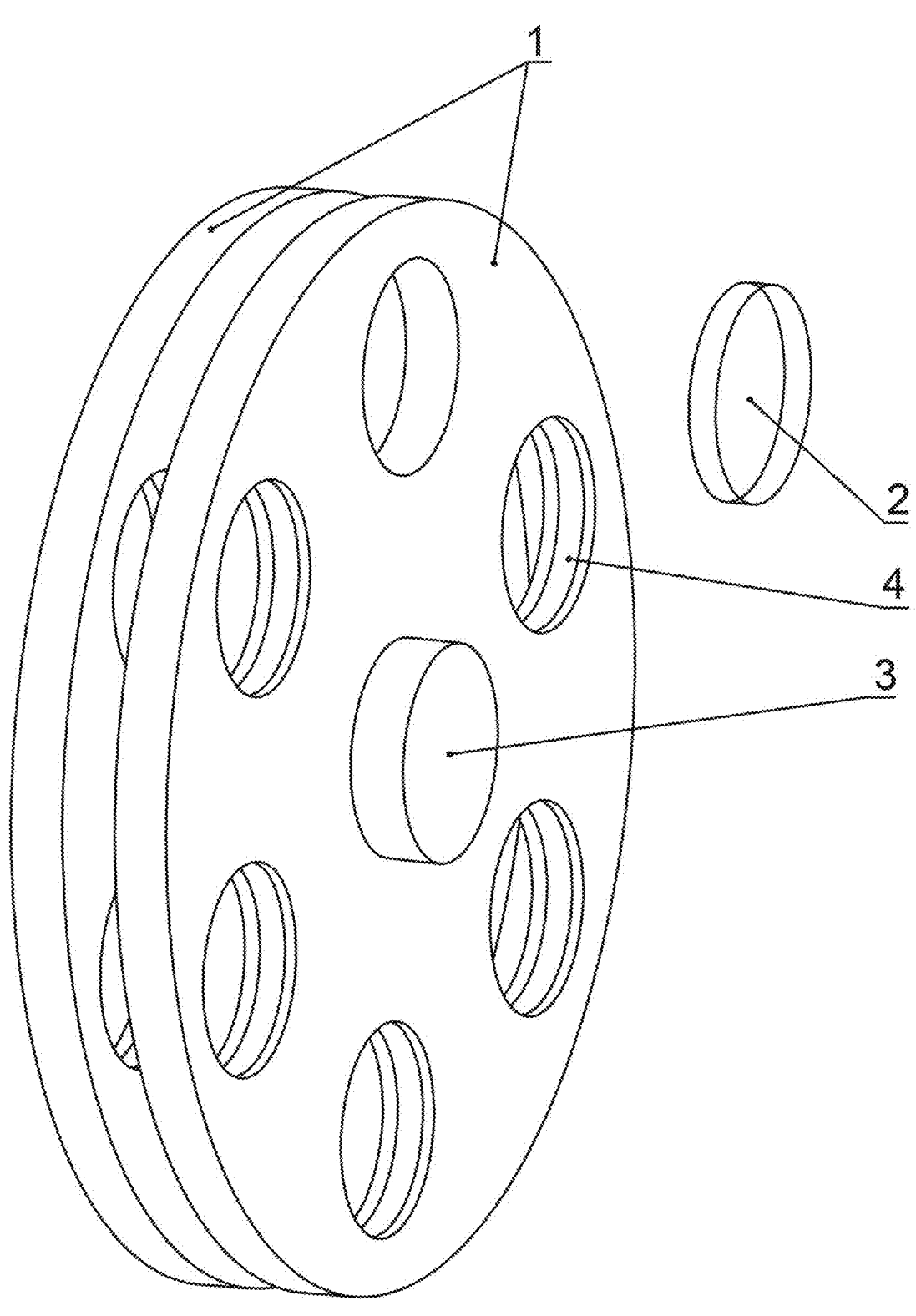
FIG. 2 is a structural diagram of a multi-wavelength and multi-stage filter wheel.

A structure of the multi-wavelength and multi-stage filter wheel 124, as shown in FIG. 2, includes light filter discs 1, light filters 2, and a servo motor 3. Six circular holes 4 are disposed on each light filter disc 1. The light filters 2 are installed in the circular holes 4, and the light filters 2 in different circular holes 4 have different central wavelengths and different spectral linewidths. There are two light filter discs 1 in total, the circular holes 4 in one of the two light filter discs 1 are in one-to-one correspondence to and are overlapped with the circular holes 4 in another one of the two light filter discs 1, and the light filters 2 installed in the two overlapped circular holes 4 have different central wavelengths and different spectral linewidths. A purpose of this design is to implement double-layer filtering, so as to obtain monochromatic light with higher purity.

The composite light emitted by the multi-wavelength and multi-light-intensity light source 123 sequentially passes through two light filters 2 in the circular holes 4 of the multi-wavelength and multi-stage filter wheel 124 to become monochromatic light.

The two light filter discs 1 are fixedly connected to the servo motor 3 as a whole. Driven by the servo motor 3, the two light filter discs 1 move circumferentially around a central axis of the two light filter discs 1, so that different circular holes 4 and light filters 2 move to the front of the composite light for filtering to obtain monochromatic lights with different central wavelengths and spectral linewidths.

Incident light intensity of the monochromatic light is $I_0$, light absorption intensity absorbed by a target species is $I_a$, and transmission intensity transmitted from the target species to the multi-species perception module 15 is $I_t$, that is, $I_0 = I_a + I_t$. To ensure that after the monochromatic light is absorbed and attenuated by a sample, the multi-species perception module 15 can still receive the signal of the monochromatic light, and the incident light intensity $I_0$ needs to be ensured to meet the following conditions:

$I_0 - I_a = I_t > 0$, that is, $I_0 > I_a$

The light intensity control module 13 includes a power/current continuously adjustable regulator 131, which can dynamically adjust the light intensity of monochromatic light to meet the requirements of light absorption intensity $I_a$ and transmission intensity $I_t$ of the target species. In some embodiments, the light intensity control module 13 includes a current regulator, for dynamically adjusting the light intensity of monochromatic light to meet the requirements of light absorption intensity $I_a$ and transmission intensity $I_t$ of the target species. The PLC control module 11 changes current of the multi-wavelength and multi-light-intensity light source 123 from low to high by adjusting a knob of the power/current continuously adjustable regulator 131. When a concentration of the target species changes between a minimum value and a maximum value, adapted incident light intensity $I_0$ can be provided, so as to ensure that after the monochromatic light is absorbed and attenuated by the target species, the multi-species perception module 15 is still able to receive a signal of the monochromatic light.

The sensitivity adjustment module 14 is formed by combining flow cells 141 with different optical paths, and different optical paths may be recombined based on different concentrations of the target species. The adjustment range is 0.5 mm to 100 mm. When the concentration of the target species is relatively large, the optical path is decreased, so that the total number of the target species transmitted by the monochromatic light is relatively small. When the concentration of the target species is relatively small, the optical path is increased, so that the total number of the target species transmitted by the monochromatic light is relatively large. In this way, the light absorption intensity of the target species is adjusted, so that the monochromatic light received by the multi-species perception module 15 meets the following conditions:

(1) under different concentrations, light absorption sensitivity $\Delta I_a$ of the target species is the maximum;

(2) when the target species has a maximum concentration, the multi-species perception module 15 is able to receive a signal of the monochromatic light absorbed and attenuated by the target species, that is, $I_t>0$; and (3) when the target species has a minimum concentration, the monochromatic light received by the multi-species perception module 15 is attenuated, that is, $I_0>I_t>0$.

The multi-species perception module 15 including an optoelectronic receiver 151 and a signal amplifier 152, may receive monochromatic light with different central wavelengths corresponding to different target species, and transmission intensities $I_t$ under different incident intensities and different optical paths corresponding to different concentrations, convert a received light signal into an electrical signal, amplifies the electrical signal, and feeds back amplified electrical signal to the PLC control module 11 in real time.

A working flow in the embodiment is as follows:

S1, the PLC control module 11 sends an instruction 1 for determining the target species to the monochromatic light purification module 12 based on requirements of a valence state, a form, a phase state and concentration of the target species from an upper computer;

S2, the monochromatic light purification module 12 enables the multi-wavelength and multi-light-intensity light source 123 based on the instruction 1, rotates the multi-wavelength and multi-stage filter wheel 124, and outputs high-purity monochromatic light; the high-purity monochromatic light output in this case is referred to as output 1; at this time, the light intensity control module 13 and the sensitivity adjustment module 14 do not work, and the output 1 directly reaches the multi-species perception module 15;

S3, the multi-species perception module 15 measures the output 1 to obtain a measurement result, that is, feedback 1, and sends the feedback 1 to the PLC control module 11;

S4, the PLC control module 11 selects from the light filters of the multi-wavelength and multi-stage filter wheel 124 based on the feedback 1 until the monochromatic light with optimal central wavelength and spectral linewidth that meets the requirement of the instruction 1 is obtained; the monochromatic light in this case is referred to as optimal incident light;

S5, the PLC control module 11 sends an instruction 2 that includes concentration change range of the target species defined by the maximum concentration and minimum concentration to the light intensity control module 13;

S6, the light intensity control module 13 dynamically adjusts the knob of the power/current continuously adjustable regulator 131 from low to high based on the instruction 2, so that the monochromatic light purification module 12 emits monochromatic lights with different light intensities $I_0$; the monochromatic light output in this case is referred to as output 2; at this time, the sensitivity adjustment module 14 does not work, and the output 2 directly reaches the multi-species perception module 15;

S7, the multi-species perception module 15 measures the output 2 to obtain a measurement result, that is, feedback 2, and sends the feedback 2 to the PLC control module 11;

S8, the PLC control module 11 adjusts the knob of the power/current continuously adjustable regulator 131 based on the feedback 2 to form closed-loop control until a light intensity $I_0$ of the optimal incident light that meets the following condition is obtained:

when the concentration of the target species changes between the minimum concentration and the maximum concentration, the multi-species perception module 15 is able to receive a transmission signal of the optimal incident light, that is, $I_t>0$;

S9, the PLC control module 11 sends an instruction 3 that includes a high-frequency concentration change range of the target species to the sensitivity adjustment module 14;

S10, the sensitivity adjustment module 14 automatically adjusts a combination of the flow cells 141 from low to high based on the instruction 3, so that the optical path of the monochromatic passing through the sensitivity adjustment module 14; the monochromatic light emitted by the sensitivity adjustment module 14 is referred to as output 3;

S11, the multi-species perception module 15 measures the output 3 to obtain a measurement result, that is, feedback 3, and sends the feedback 3 to the PLC control module 11;

S12, the PLC control module 11 adjusts the optical path of the sensitivity adjustment module 14 based on the feedback 3 to form closed-loop control until an optimal optical path that meets the following condition is obtained:

(1) under different concentrations, light absorption sensitivity $\Delta Ia$ of the target species is the maximum;

(2) when the target species has the maximum concentration, the multi-species perception module 15 is able to receive a signal of the monochromatic light absorbed and attenuated by the target species, that is, $I_t>0$; and (3) when the target species has the minimum concentration, the monochromatic light received by the multi-species perception module 15 is attenuated, that is, $I_0>I_t>0$.

Specific measurement cases are as follows:

After an instruction for determining $Cu^{2+}$ concentration is delivered from the upper computer, the PLC control module 11 sends an instruction 1 for determining $Cu^{2+}$ to the monochromatic light purification module 12. The multi-wavelength and multi-light-intensity light source 123 of the monochromatic light purification module 12 emits 180-900 nm composite light. The multi-wavelength and multi-stage filter wheel 124 rotates to the light filter with a central wavelength of 810 nm and a spectral linewidth of 0.03 nm, and outputs the monochromatic light with a wavelength of $\lambda_i$=810 nm±0.03 nm.

The PLC control module 11 sends an instruction for determining the $Cu^{2+}$ concentration as 100-40000 mg/L to the light intensity control module 13. The light intensity control module 13 dynamically adjusts power-current (P-I) parameters of the power/current continuously adjustable regulator 131 until the light intensity $I_0$ of the monochromatic light is greater than $I_a$ when the $Cu^{2+}$ concentration varies in a range of 100-40000 mg/L. In this case, the P-I parameters are as follows: P=5 mW, and I=42 mA.

The PLC control module 11 sends an instruction 3 for determining the concentration of $Cu^{2+}$ as 20000-40000 mg/L to the sensitivity adjustment module 14, and the sensitivity adjustment module 14 automatically adjusts an optical path of the flow cell 141. A signal of the monochromatic light passing through the flow cell 141 is fed back by the multi-species perception module 15 to the PLC control module 11 until it is determined that transmission light of different concentration target species has an appropriate signal under an optimal optical path condition. In a case that the optical path is 5 mm, $I_t$>0 when the $Cu^{2+}$ concentration is maximum, and $I_0$>$I_t$ when the $Cu^{2+}$ concentration is minimum.

Although the embodiments of the present disclosure have already been illustrated and described, the embodiments of the present disclosure are not merely used in the specification and implementations and can be completely applied to various fields of the present disclosure. For those skilled in the art and ordinary skilled in the art, various changes, modifications, replacements and transformations can be made without departing from the principle and the spirit of the present disclosure, and thus the present disclosure should be restricted by claims and equivalents thereof.

What is claimed is:

1. An optical component for directly measuring an original valence state, an original form and an original phase state of liquid in real time, comprising:

a Programmable Logic Controller (PLC) control module, a monochromatic light purification module, a light intensity control module, a sensitivity adjustment module, and a multi-species perception module;

wherein the monochromatic light purification module comprises a power switch, a power adapter, a multi-wavelength and multi-light-intensity light source, and a multi-wavelength and multi-stage filter wheel; the power switch and the power adapter are configured to convert 220V alternating current into 5V/2 A direct current, and supply power to the multi-wavelength and multi-light-intensity light source; the multi-wavelength and multi-light-intensity light source is configured to emit composite light;

the multi-wavelength and multi-stage filter wheel comprises two light filter discs, light filters, and a servo motor; circular holes are disposed on each light filter disc, and a number of the circular holes is not less than 2; the light filters are installed in the circular holes, and the light filters in different circular holes have different central wavelengths and different spectral linewidths; there are two light filter discs in total, the circular holes in one of the two light filter discs are in a one-to-one correspondence to and are overlapped with the circular holes in another one of the two light filter discs, and the light filters installed in two overlapped circular holes have different central wavelengths and different spectral linewidths;

the composite light emitted by the multi-wavelength and multi-light-intensity light source sequentially passes through two light filters in the circular holes of the multi-wavelength and multi-stage filter wheel to become monochromatic light;

the two light filter discs are fixedly connected to the servo motor as a whole; driven by the servo motor, the two light filter discs move circumferentially around a central axis of the two light filter discs, so that different circular holes and light filters move to a front of the composite light for filtering to obtain monochromatic lights with different central wavelengths;

incident light intensity of the monochromatic light is defined as $I_0$, light absorption intensity absorbed by a target species is defined as $I_a$, and transmission intensity transmitted from the target species to the multi-species perception module is defined as such that $I_t$, $I_0$=$I_a$+$I_t$ holds true;

the light intensity control module comprises a power/current continuously adjustable regulator; the PLC control module changes $I_0$ of the monochromatic light by adjusting the power/current continuously adjustable regulator, and meets the following conditions:

when a concentration of the target species changes between a minimum value and a maximum value, after the monochromatic light is absorbed and attenuated by the target species, the multi-species perception module is still able to receive a signal of the monochromatic light, such that $I_t$>0 holds true;

the sensitivity adjustment module is formed by combining flow cells with different optical paths, and adjusts different optical paths based on different concentrations of the target species; when the concentration of the target species is larger than a maximum concentration, an optical path is decreased, so that a total number of the target species is decreased; when the concentration of the target species is smaller than a minimum concentration, the optical path is increased, so that the total number of the target species is increased; the monochromatic light received by the multi-species perception module meets the following conditions:

(1) under different concentrations, light absorption sensitivity $\Delta I_a$ of the target species is a maximum;

(2) when the target species has the maximum concentration, the multi-species perception module is able to receive a signal of the monochromatic light absorbed and attenuated by the target species, such that $I_t$>0 holds true;

(3) when the target species has the minimum concentration, the monochromatic light received by the multi-species perception module is attenuated, such that $I_0$>$I_t$>0 holds true; and the multi-species perception module comprises an optoelectronic receiver and a signal amplifier and is configured to receive monochromatic lights with different central wavelengths corresponding to different target species, and transmission intensities $I_t$ under different incident intensities and different optical paths corresponding to different concentrations, convert a received light signal into an electrical signal, amplify the electrical signal, and feed back amplified electrical signal to the PLC control module in real time.

2. The optical component for directly measuring the original valence state, the original form and the original phase state of the liquid in real time according to claim 1, wherein the composite light has a wavelength range of 180-900 nm; each of the two light filters has a spectral linewidth of ±0.03 nm; and the sensitivity adjustment module has an optical path range of 0.5 mm to 100 mm.

3. A working process for the optical component for directly measuring the original valence state, the original form and the original phase state of the liquid in real time according to claim 1, the working process comprising the steps of:

S1, sending, by the PLC control module, a first instruction for determining the target species to the monochromatic light purification module based on requirements of a valence state, a form, a phase state and concentration of the target species from an upper computer;

S2, enabling, by the monochromatic light purification module, the multi-wavelength and multi-light-intensity light source based on the first instruction, rotating the multi-wavelength and multi-stage filter wheel, and outputting monochromatic light referred to as a first output; wherein, in this case, the light intensity control module and the sensitivity adjustment module do not work, and the first output directly reaches the multi-species perception module;

S3, measuring, by the multi-species perception module, the first output to obtain a measurement result referred to as a first feedback, and sending the first feedback to the PLC control module;

S4, selecting, by the PLC control module, from the light filters of the multi-wavelength and multi-stage filter wheel based on the first feedback until the monochromatic light with central wavelength and spectral linewidth that is required by the first instruction is obtained and is referred to as optimal incident light;

S5, sending, by the PLC control module, a second instruction that comprises a concentration change range of the target species defined by the maximum concentration of the target species and minimum concentration of the target species to the light intensity control module;

S6, dynamically increasing, by the light intensity control module, the power/current continuously adjustable regulator based on the second instruction, such that the monochromatic light purification module emits monochromatic lights with different light intensities $I_0$, referred to as a second output; wherein, in this case, the sensitivity adjustment module does not work, and the second output directly reaches the multi-species perception module;

S7, measuring, by the multi-species perception module, the second output to obtain a measurement result, referred to as a second feedback, and sending the second feedback to the PLC control module;

S8, adjusting, by the PLC control module, the knob of the power/current continuously adjustable regulator based on the second feedback to form closed-loop control until a light intensity $I_0$ of the optimal incident light that meets a following condition is obtained:

when the concentration of the target species changes between the minimum concentration and the maximum concentration, the multi-species perception module is able to receive a transmission signal of the optimal incident light, such that $I_t>0$ holds true;

S9, sending, by the PLC control module, a third instruction comprising a concentration change range of the target species to the sensitivity adjustment module;

S10, increasing, by the sensitivity adjustment module, a combination of the flow cells based on the third instruction, such that an optical path of the monochromatic light passing through the sensitivity adjustment module changes; wherein the monochromatic light emitted by the sensitivity adjustment module is referred to as a third output;

S11, measuring, by the multi-species perception module, the third output to obtain a measurement result, referred to as a third feedback, and sending the third feedback to the PLC control module;

S12, adjusting, by the PLC control module, the optical path of the sensitivity adjustment module based on the third feedback to form closed-loop control until an optimal optical path that meets following condition is obtained:

(1) under different concentrations, light absorption sensitivity $\Delta I_a$ of the target species is the maximum;

(2) when the target species has the maximum concentration, the multi-species perception module is able to receive a signal of the monochromatic light absorbed and attenuated by the target species, such that $I_t>0$ holds true; and (3) when the target species has the minimum concentration, the monochromatic light received by the multi-species perception module is attenuated, such that $I_0>I_t>0$ holds true.

* * * * *